United States Patent
Markle et al.

(10) Patent No.: US 7,321,993 B1
(45) Date of Patent: Jan. 22, 2008

(54) METHOD AND APPARATUS FOR FAULT DETECTION CLASSIFICATION OF MULTIPLE TOOLS BASED UPON EXTERNAL DATA

(75) Inventors: Richard J. Markle, Austin, TX (US); Elfido Coss, Jr., Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 575 days.

(21) Appl. No.: 10/883,364

(22) Filed: Jul. 1, 2004

(51) Int. Cl.
*G06F 11/00* (2006.01)

(52) U.S. Cl. .......................................... 714/47; 714/48
(58) Field of Classification Search .................. 714/47, 714/46, 48; 702/185
See application file for complete search history.

(56) References Cited

U.S. PATENT DOCUMENTS

| | | | | |
|---|---|---|---|---|
| 5,434,837 | A | * | 7/1995 | Haneda et al. ........... 369/53.17 |
| 5,574,346 | A | * | 11/1996 | Chavan et al. ............... 318/434 |
| 5,864,773 | A | * | 1/1999 | Barna et al. ................... 702/85 |
| 6,169,387 | B1 | * | 1/2001 | Kaib ........................... 320/132 |
| 6,594,589 | B1 | * | 7/2003 | Coss et al. ..................... 702/34 |
| 6,917,839 | B2 | * | 7/2005 | Bickford ....................... 700/30 |
| 6,988,225 | B1 | * | 1/2006 | Purdy et al. ................... 714/49 |
| 6,991,945 | B1 | * | 1/2006 | Castle et al. .................. 438/14 |
| 7,100,081 | B1 | * | 8/2006 | Purdy et al. ................... 714/25 |

* cited by examiner

*Primary Examiner*—Dieu-Minh Le
(74) *Attorney, Agent, or Firm*—Williams, Morgan & Amerson, P.C.

(57) ABSTRACT

The present invention is generally directed to various methods and systems for fault detection control of multiple tools based upon external data. In one illustrative embodiment, the method includes monitoring each of a plurality of tools to determine if a fault condition occurs in any of the tools, each of the tools being comprised of at least one integrated metrology device, monitoring external data regarding at least one parameter that may impact an operation performed in each of the tools, and determining if an indicated fault condition in at least one of the tools is a valid fault condition or a systemic fault condition associated with a change in a value of the at least one parameter.

55 Claims, 4 Drawing Sheets

METHOD AND APPARATUS FOR FAULT DETECTION CLASSIFICATION OF MULTIPLE TOOLS BASED UPON EXTERNAL DATA

BACKGROUND OF THE INVENTION

1. Field of the Invention

This invention relates generally to an industrial process, and, more particularly, to a method and apparatus for fault detection classification of multiple tools based upon external data.

2. Description of the Related Art

After a complete reading of the present application, those skilled in the relevant art will understand that the present invention has broad application to a variety of industries involving the manufacture of a variety of different types of devices or workpieces. By way of example only, the background of the application will be discussed in the context of various problems encountered in the manufacture of integrated circuit devices. However, the present invention is not to be considered as limited to use only within the semiconductor manufacturing industry.

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of process tools, including photolithography steppers, etch tools, deposition tools, polishing tools, thermal anneal process tools, implantation tools, etc. The technologies underlying semiconductor process tools have attracted increased attention over the last several years, resulting in substantial refinements. However, despite the advances made in this area, many of the process tools that are currently commercially available suffer certain deficiencies. In particular, some of such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various process tools. The manufacturing tools communicate with a manufacturing frame-work or a network of processing modules. Each manufacturing tool is generally connected to an equipment interface. The equipment interface is connected to a machine interface that facilitates communications between the manufacturing tool and the manufacturing frame-work. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Target values for the various processes performed are generally based on design values for the devices being fabricated. For example, a particular process layer may have a target thickness. Operating recipes for deposition tools and/or polishing tools may be automatically controlled to reduce variation about the target thickness. In another example, the critical dimensions of a transistor gate electrode may have an associated target value. The operating recipes of photolithography tools and/or etch tools may be automatically controlled to achieve the target critical dimensions.

Typically, a control model is used to generate control actions for changing the operating recipe settings for a tool being controlled based on feedback or feedforward metrology data collected related to the processing by the tool. To function effectively, a control model must be provided with metrology data in a timely manner and at a quantity sufficient to maintain its ability to predict the future operation of the tool it controls.

Within many manufacturing industries great effort is made to insure that processing operations are performed accurately such that the resulting device meets target specifications. This is particularly true within the semiconductor manufacturing industry wherein many metrology tools and sensors are used to acquire a vast amount of metrology data to determine the effectiveness and accuracy of the processing operations performed in a tool and/or the compliance of the resulting workpiece with product specifications. Additionally, modern semiconductor manufacturing involves the use of various fault detection control routines and schemes to determine when a process operation or a particular tool is producing unacceptable results.

In sophisticated manufacturing operations, such as semiconductor manufacturing operations, the process operations performed in various tools are very sensitive to many parameters. That is, slight changes in certain parameters may adversely impact the ability of the various tools to perform the process operation repeatedly and reliably so as to result in acceptable finished workpieces. Moreover, in many manufacturing industries, there is the always existent desire to maximize profitability or throughput thereby requiring that the tools operate for extended durations without being taken out of service. However, in some situations, existing fault detection routines and schemes may erroneously indicate a fault condition for one or more tools when in fact there is no problem with the actual tool. Thus, in some situations, valuable processing capability may be lost when tools are inadvertently shut down due to erroneous indications of fault conditions.

The present invention is directed to overcoming, or at least reducing the effects of, one or more of the problems set forth above.

SUMMARY OF THE INVENTION

The present invention is generally directed to various methods and systems for fault detection classification of multiple tools based upon external data. The present invention may be used with tools adapted to perform a variety of operations, e.g., process operations, metrology operations, etc. In one illustrative embodiment, the method comprises monitoring each of a plurality of tools to determine if a fault condition occurs in any of the tools, each of the tools being comprised of at least one integrated metrology device, monitoring external data regarding at least one parameter that may impact an operation performed in each of the tools, and determining if an indicated fault condition in at least one of the tools is a valid fault condition or a systemic fault condition associated with a change in a value of the at least one parameter.

In another illustrative embodiment, the method comprises monitoring each of a plurality of tools to determine if a fault condition occurs in any of the tools, each of the tools being comprised of at least one integrated metrology device, monitoring external data regarding at least one environmental parameter that may impact an operation performed in each of the tools, and determining if an indicated fault condition in at least one of the tools is a valid fault condition or a systemic fault condition associated with a change in a value of the at least one parameter.

In yet another illustrative embodiment, the method comprises monitoring each of a plurality of tools to determine if a fault condition occurs in any of the tools, each of the tools being comprised of at least one integrated metrology device, monitoring external data regarding at least one parameter that may impact an operation performed in each of the tools, and determining if an indicated fault condition in at least one of the tools is a valid fault condition or a systemic fault condition associated with a change in a value of the at least one parameter. In further embodiments, the method comprises processing additional workpieces in the tools after the step of determining if the indicated fault condition is a valid fault condition or a systemic fault condition is performed.

In a further illustrative embodiment, the method comprises monitoring each of a plurality of tools that process at least one semiconducting wafer to determine if a fault condition occurs in any of the tools, each of the tools being comprised of at least one integrated metrology device, monitoring external data regarding at least one environmental parameter that may impact an operation performed in each of the tools, and determining if an indicated fault condition in at least one of the tools is a valid fault condition or a systemic fault condition associated with a change in a value of the at least one parameter.

In yet a further illustrative embodiment, the method comprises monitoring each of a plurality of tools that process at least one wafer to determine if a fault condition occurs in any of the tools, each of the tools being comprised of at least one integrated metrology device, monitoring external data regarding at least one parameter that reflects a physical characteristic of at least one wafer, and determining if an indicated fault condition in at least one of the tools is a valid fault condition or a systemic fault condition associated with a change in a value of the at least one parameter.

BRIEF DESCRIPTION OF THE DRAWINGS

The invention may be understood by reference to the following description taken in conjunction with the accompanying drawings, in which like reference numerals identify like elements, and in which.

Figure 1:
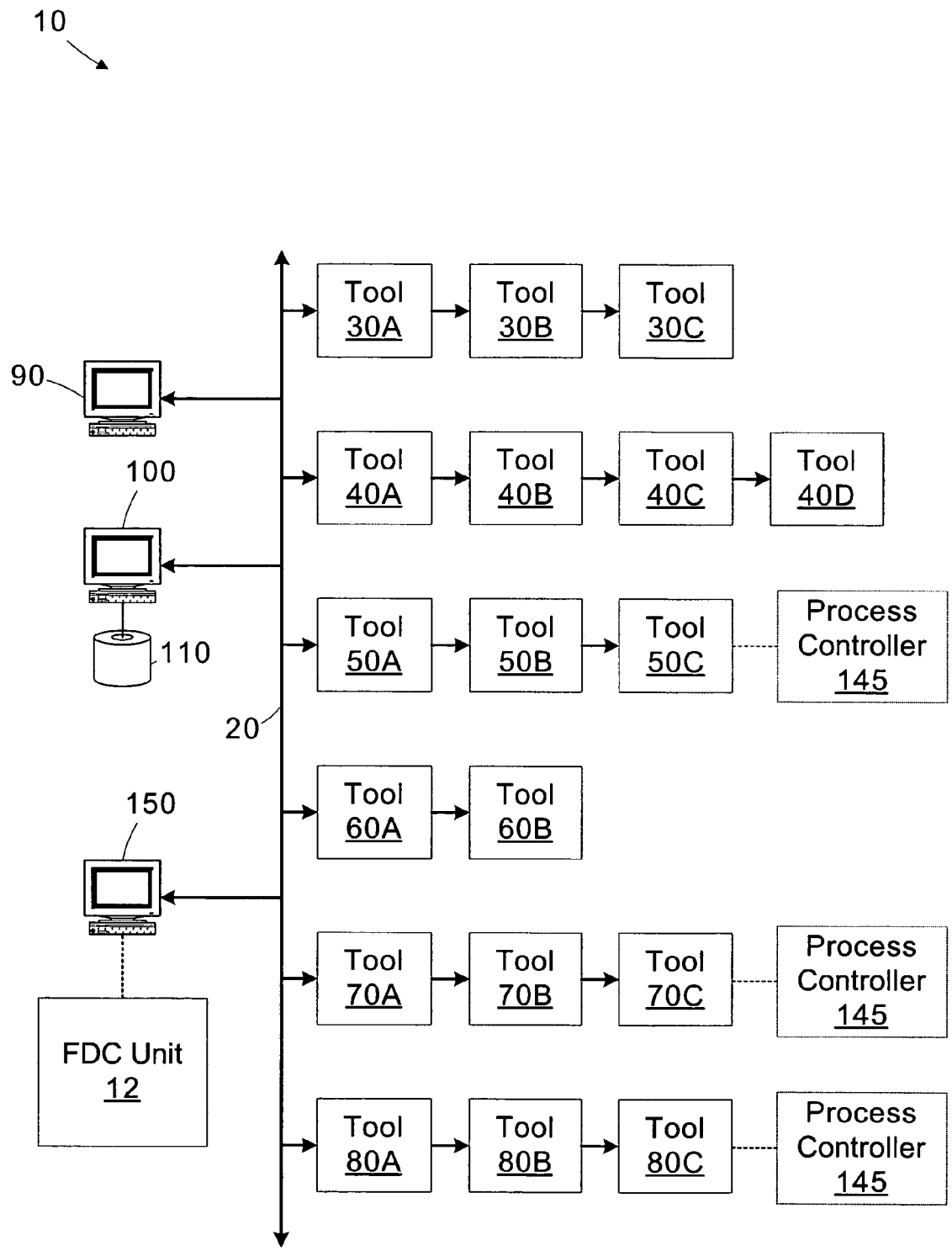
FIG. 1 is a simplified block diagram of a manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

A network 20 interconnects various components of the manufacturing system 10, allowing them to exchange information. The illustrative manufacturing system 10 includes a plurality of tools 30-80. Each of the tools 30-80 may be coupled to a computer (not shown) for interfacing with the network 20. The tools 30-80 are grouped into sets of like tools, as denoted by lettered suffixes. For example, the set of tools 30A-30C represent tools of a certain type, such as a chemical mechanical planarization tool. A particular wafer or lot of wafers progresses through the tools 30-80 as it is being manufactured, with each tool 30-80 performing a specific function in the process flow. Exemplary processing tools for a semi-conductor device fabrication environment include metrology tools, photolithography steppers, etch tools, deposition tools, polishing tools, rapid thermal anneal tools, implantation tools, etc. The tools 30-80 are illustrated in a rank and file grouping for illustrative purposes only. In an actual implementation, the tools 30-80 may be arranged in any physical order or grouping. Additionally, the connections between the tools in a particular grouping are meant to represent connections to the network 20, rather than interconnections between the tools 30-80.

A manufacturing execution system (MES) server or controller 90 directs high level operation of the manufacturing system 10. The MES server 90 may monitor the status of the various entities in the manufacturing system 10 (i.e., lots, tools 30-80) and control the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, operating recipes, etc. The controller 90 may also provide operating recipes to one or more of the tools depicted in FIG. 1. Of course, the controller 90 need not perform all of these functions. Moreover, the functions described for the controller 90 may be performed by one or more computers spread throughout the system 10.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The manufacturing system 10 also includes a fault detection classification (FDC) unit 12 executing on an illustrative workstation 150. The FDC unit 12 determines whether the various tools within the manufacturing facility 10 are performing within acceptable processing limits so as to produce workpieces, e.g., wafers, meeting pre-established specifications for such products. The FDC unit 12 described herein may be used as described herein with any type of tool that is used to perform any type of operation. For example, the FDC unit 12 may be used as described herein with any of a variety of different metrology tools and any of a variety of different process tools, e.g., etch tools, deposition tools, CMP tools, etc. Thus, the present invention should not be considered as limited in use to any particular type of tool unless such limitations are expressly set forth in the appended claims.

The FDC unit 12 may communicate with the controller 90 and/or with one or more process controllers 145 associated with the individual tools 30-80 for purposes to be described later herein. The particular control models used by the process controllers 145 depend on the type of tool 30-80 being controlled. The control models may be developed empirically using commonly known linear or non-linear techniques. The control models may be relatively simple equation-based models (e.g., linear, exponential, weighted average, etc.) or a more complex model, such as a neural network model, principal component analysis (PCA) model, partial least squares projection to latent structures (PLS) model. The specific implementation of the control models may vary depending on the modeling techniques selected and the process being controlled. The selection and development of the particular control models would be within the ability of one of ordinary skill in the art, and accordingly, the control models are not described in greater detail herein for clarity and to avoid obscuring the instant invention.

An exemplary information exchange and process control framework suitable for use in the manufacturing system 10 is an Advanced Process Control (APC) framework, such as may be implemented using the Catalyst system formerly offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The processing and data storage functions are distributed amongst the different computers or workstations in FIG. 1 to provide general independence and central information storage. Of course, different numbers of computers and different arrangements may be used without departing from the spirit and scope of the instant invention.

Figure 2:
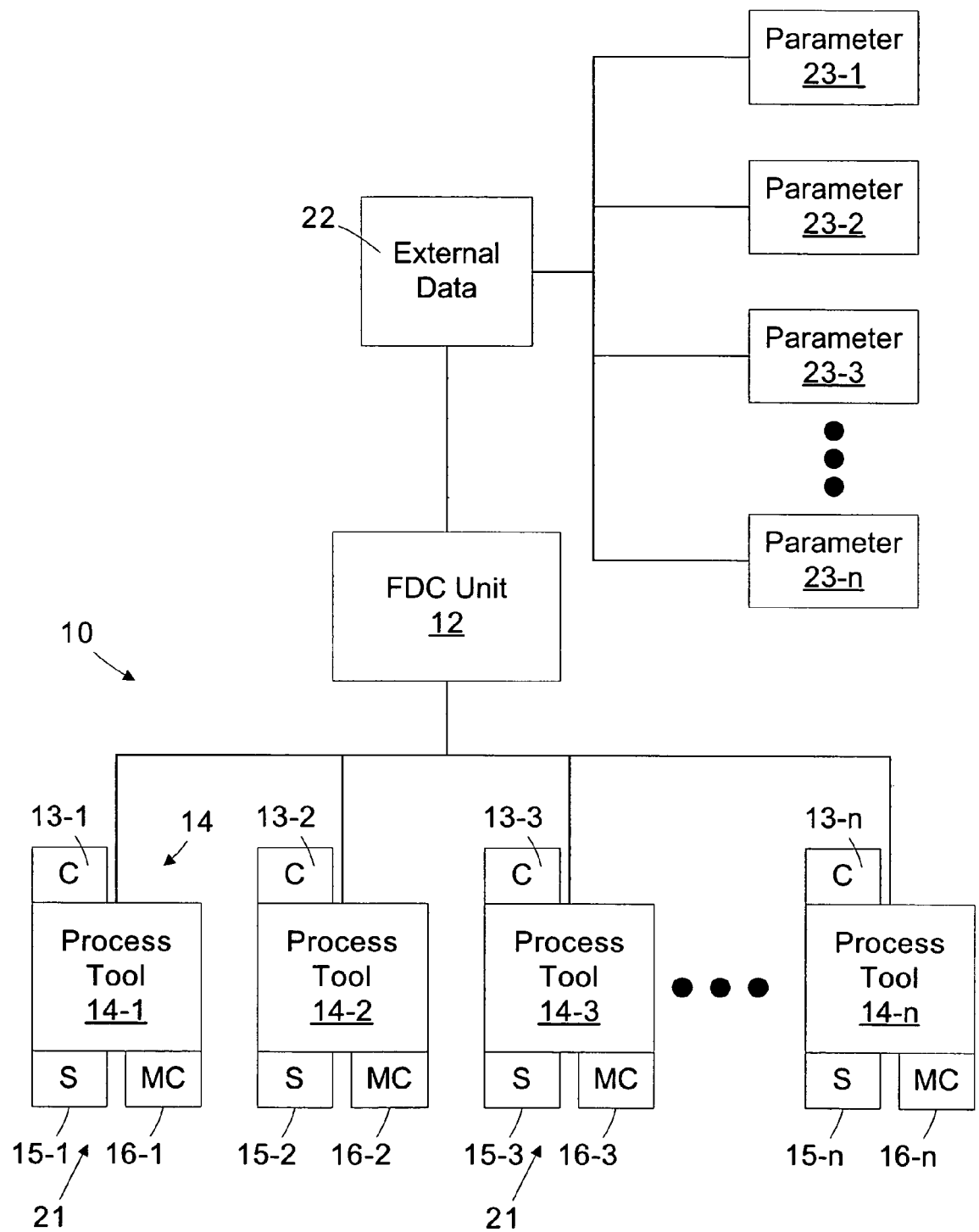
FIG. 2 is a simplified block diagram of a more detailed depiction of a fault detection system in accordance with one illustrative embodiment of the present invention.

FIG. 2 is a more specific, simplified block diagram of a manufacturing system 10 in accordance with one illustrative embodiment of the present invention. As shown therein, the FDC unit 12 is operatively coupled to a plurality of tools 14. In the illustrative embodiment, four such illustrative tools, 14-1, 14-2, 14-3 and 14-$n$ are schematically depicted. However, the present invention may be employed with any such number of tools. As stated previously, the tools 14 may be any of a variety of metrology tools or process tools. In the embodiment depicted in FIG. 2, each of the tools 14 comprises at least one integrated metrology device 21 that is operatively coupled to each of the individual tools 14. For example, the integrated metrology device 21 may comprise at least one sensor 15 and/or at least one metrology chamber 16. As used herein, the term integrated metrology device should be understood to include any type of sensor 15 that is resident on an illustrative tool, e.g., a process tool or a metrology tool, or a metrology chamber or station integrated within a process tool. Such a sensor 15 or chamber 16 may be part of the original equipment supplied with the tool 14 or it may be added subsequent to the original manufacture of the tool 14. In some embodiments, each of the tools 14 further comprise a local controller 13.

As indicated previously, the tools 14 may be comprised of any of a variety of different types of tools useful in manufacturing a workpiece and/or performing metrology operations. In the context of a semiconductor manufacturing operation, the tools 14 may be process tools, such as a deposition tool, a thermal growth tool, an etching tool, a furnace, a rapid thermal anneal chamber, a photolithography tool, a chemical mechanical polishing tool, etc. In the illustrative example where the tools 14 are metrology tools, the tools 14 may be a metrology tool adapted to measure at least one of film thickness, film optical properties, surface profile, critical dimensions, etc. Thus, the present invention should not be considered as limited to any particular type of tool nor to the type of operation such tool performs.

Additionally, the sensors 15 may be any type of sensor useful for sensing any parameter. For example, the sensor 15 may be a metrology device useful for sensing wafer state data, tool state data, or process state data. By way of example only, wafer state data may include parameters that reflect a physical condition of the workpiece, e.g., a thickness of a process layer, a critical dimension of a feature formed on a workpiece, a topography of a surface of a workpiece, optical properties of a film, presence or absence of defects, etc. Tool state data may include parameters such as pressure, temperature, the flow rate of a gas or liquid to a process tool, RF power, polishing arm downforce, spin speeds, exposure dose, etc. Process state data may include such factors such as the power level of a plasma generated within a process chamber, the temperature and/or pressure within a process chamber during a process operation, presence or absence of one or more chemical species (RGAs, OES, etc.), etc. The sensor(s) 15 may be operatively coupled to the tool 14 in any desired manner so that it may perform the metrology functions described herein.

Figure 3:
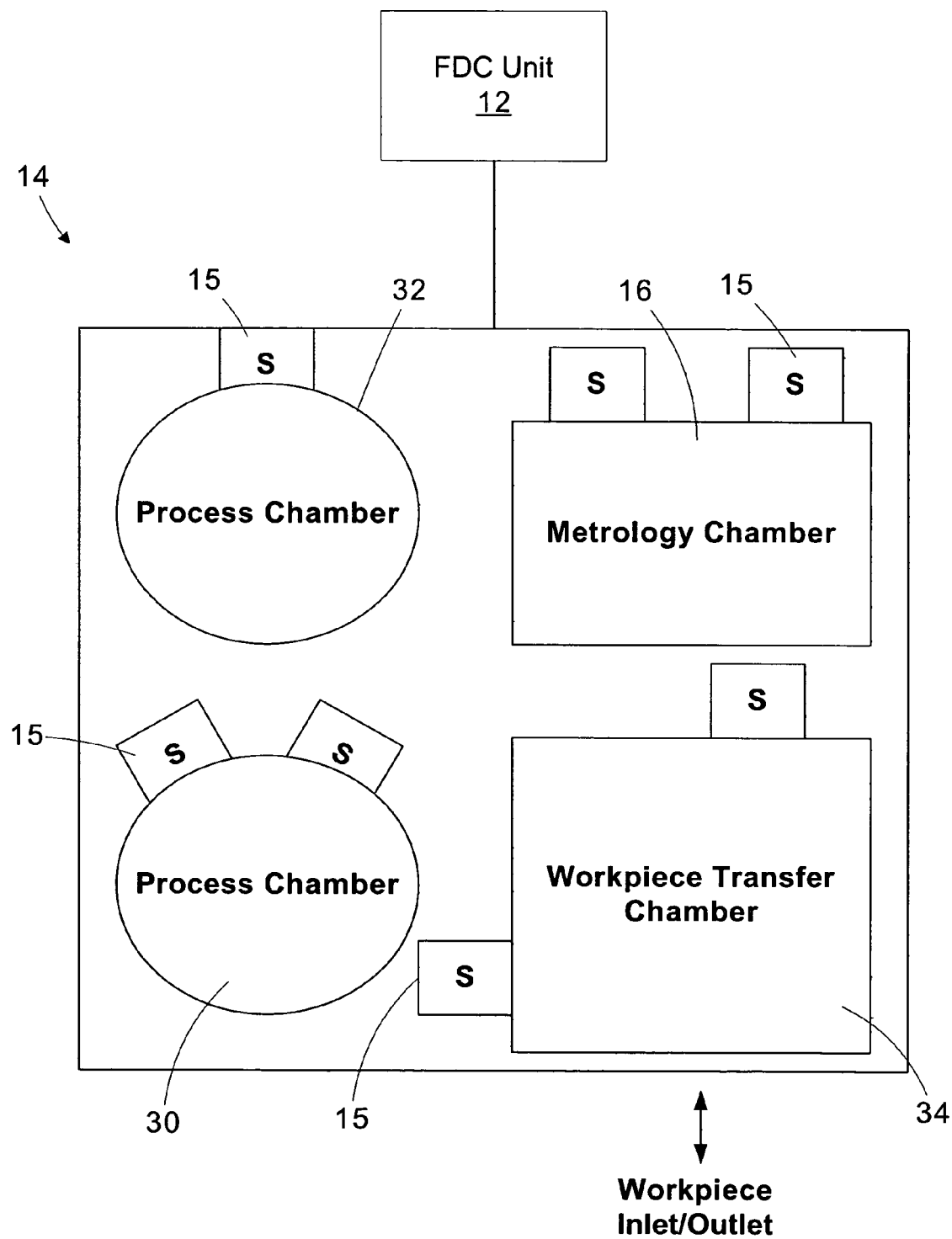
FIG. 3 is a simplified block diagram of an illustrative tool that may be employed with the present invention.

Similarly, the metrology chamber or station 16 may be of any desired configuration and may be operatively coupled to the tool 14 in any desired manner. FIG. 3 depicts an illustrative example of such a tool 14. In one illustrative embodiment, the metrology chamber 16 may be a separate metrology chamber 16 within a multi-chamber tool 14 comprised of a plurality of process chambers 30, 32 and a stand-alone metrology chamber 16. Alternatively, the metrology chamber 16 may also simply be a metrology station positioned somewhere within the tool 14. In one illustrative embodiment, the metrology station or chamber may be part of the workpiece transfer station 34 shown in the illustrative process tool 14 depicted in FIG. 3. Thus, the present invention should not be considered as limited to any particular type of metrology chamber or station unless such limitations are expressly recited in the appended claims.

As indicated in FIG. 2, the FDC unit 12 is adapted to receive or have access to external data 22. The external data 22 may relate to any of a variety of parameters $23_1$, $23_2$, $23_3 \ldots 23_n$. The external data 22 comprises data regarding any of a variety of parameters 23 that may impact a processing or metrology operation performed in the tools 14. The parameters that make up the external data 22 may vary depending upon the particular application. Typically, an allowable or acceptable range of values for each of the monitored parameters 23 may be established, wherein the operations performed by the various tools 14 will not be substantially affected by the value of the monitored parameters 23 as long as the measured value of the parameter 23 remains within the acceptable limits.

In one particular embodiment, the external data 22 comprises a plurality of environmental parameters such as atmospheric pressure, humidity, the flow rate of a liquid or chemical flowing to the tools 14, the pressure of a liquid flowing to the tools 14, the concentration of any chemicals within such a liquid or gas, air or liquid particle counters, the composition of the local environment, the chemical make-up of gases, the presence of trace amounts of gases, etc. In other embodiments, the external data 22 may reflect the results of previous processing operations performed by other process tools prior to a workpiece being introduced into the tools 14. In one particular example, the external data 22 may reflect wafer state data. For example, in this context, the external data 22 may reflect a physical characteristic of the incoming wafer, e.g., the incoming thickness of a previously formed layer, the optical properties of such a layer, the surface topography of such a layer, etc. The external data 22 may be acquired by using any of a variety of metrology tools or sensors using a variety of known techniques. For example, the external data 22 may be acquired via stand-alone metrology tools, additional sensors positioned elsewhere within a manufacturing facility and/or sensors positioned in other processing tools.

In accordance with one aspect of the present invention, the external data 22 may be used by the FDC unit 12 in analyzing various fault conditions indicated by one or more of the plurality of tools 14. More specifically, by analyzing such external data 22, the FDC unit 12 may be able to identify erroneous or invalid fault conditions issued by one or more of the tools 14 during process operations. In the illustrative example where the external data 22 is comprised of environmental data, e.g., humidity, ambient pressure, ambient temperature, gas flow rates to all of the process tools, etc., the present invention may be used to determine whether indicated faults for the various tools 14 are valid or whether the indicated fault conditions merely reflect systemic problems due to changes in the environmental data.

One illustrative example of the present invention will now be discussed in the context where the workpiece is a semiconducting substrate and the tools 14 are oxidation chambers that are adapted to thermally grow a layer of silicon dioxide on a semiconducting substrate. A change in the humidity within the manufacturing facility may have an impact on the thermal growth process performed in each of the tools 14. That is, the changes in the humidity within the manufacturing environment may cause a pre-established thermal growth process that is performed in one or more of the tools 14 to form a thermally grown layer of silicon dioxide that is not in compliance with product specifications, e.g., the layer may be too thick or too thin. One or more integrated metrology devices, e.g., the sensor 15 and/or or the metrology chamber 16, in each of the tools 14 may indicate a fault condition when the resulting layer formed by the oxidation process does not fall within acceptable limits. For example, a fault condition may be indicated by one or more of the tools 14 if the resulting layer is outside of a previously established allowable range. However, the FDC unit 12, by monitoring the external data 22 which, in this case, is assumed to include the humidity within the manufacturing environment, can, in certain situations, determine whether fault conditions indicated by one or more of the respective tools 14 is a valid fault condition associated with the particular tool 14 or rather is an indication of a systemic problem due to the change in value of the monitored external data 22, e.g., the humidity.

As an even more specific example, once the FDC unit 12 determines, based on the data provided by the integrated metrology devices 21 on the various tools 14, that one or more fault conditions are indicated in one or more of the tools 14, the external data 22 may then be analyzed to determine if one or more of the indicated faults are valid fault conditions and/or whether the indicated faults are reflective of a systemic problem due to a change in value of the monitored external data 22, e.g., humidity exceeding a preselected, established allowable range. In one situation, the metrology data obtained from the integrated metrology devices 21 on the tools 14 may indicate that a plurality or all of the tools 14 are indicating a fault condition. However, in this illustrative situation, the monitored external data 22, e.g., the humidity, indicates that the humidity value has exceeded a preselected, established allowable range. Thus, based on the out-of-tolerance condition for the monitored external data parameter, e.g., humidity, the FDC unit 12 may declare the indicated fault conditions for the various tools 14 to be invalid. That is, due to the out-of-tolerance condition of the monitored external data 22, the FDC unit 12 may determine that the erroneous fault conditions indicated for the various tools 14 is really a systemic problem associated with the change in value of the monitored external data 22. Accordingly, the FDC unit 12 may instruct that the indicated fault conditions be ignored, thereby allowing the tools 14 to continue to operate.

As another example, the monitored external data 22 may be used to confirm that an indicated fault condition by one or more of the tools 14 is truly indicative of a valid fault condition. By way of example only, in one illustrative situation, only one of the tools 14 may indicate a fault condition. If the monitored external data 22 indicates that the monitored parameter, e.g., humidity, is within acceptable limits, then the fault detection indicated by the individual tool 14 is confirmed to be a valid fault condition as there would appear to be no systemic problem that could be associated with a change in the value of the monitored external data 22. Accordingly, the faulty tool 14 may be removed from service and appropriate maintenance procedures may be performed on the tool 14.

In another illustrative aspect of the present invention, if it is determined that change in the external data 22 is causing a systemic problem as it relates to the processing operations performed in the tools 14, an appropriate correction factor may be established by the FDC unit 12 and/or controller 90 that may be employed in subsequent processing operations. For example, in the situation where the tools 14 are process tools that perform a thermal growth process, a change in the relative humidity beyond the pre-established acceptable limits may cause an increase in the thickness of the thermally grown layer of silicon dioxide formed in the process tools performing a standard thermal growth process recipe. That is, if the change in the external data 22, e.g., humidity, causes a change in the thickness of a layer formed in one or more of the tools 14, the FDC unit 12, or another controller within the system, may create a correction factor in an attempt to compensate for the error induced by the change in the external data 22. For example, the FDC unit 12 and/or controller 90 may calculate or determine a correction factor to be applied to data received from the integrated metrology devices 21 as future workpieces are processed in the tools 14. As a very specific example, the change in the monitored external data 22, e.g., humidity, may be associated with a corresponding change in the thickness of the resulting layer formed in the tools 14. Accordingly, data provided by the integrated metrology devices 21 on the tool 14 as additional workpieces are processed may be offset or corrected by this change in thickness due to the change in the monitored external data 22. The correction factor may be expressed as a percentage (±x %) or as an absolute parameter, e.g., ±y inches in thickness, ±z inches rms in surface roughness, etc. A similar methodology may be employed when the external data 22 reflects a parameter like the thickness or surface topography of a layer of material on the wafer that was previously formed in another process tool. In this illustrative example, the amount by which the previously formed process layer exceeds acceptable limits may be used as a correction factor to be applied to the metrology data provided by the integrated metrology devices 21 on the tool 14 as subsequent workpieces are processed through the tools 14.

In another aspect of the present invention, one or more parameters of the operation performed in the tools 14 may be adjusted in an effort to compensate for the error induced by the change in the external data 22. In one illustrative embodiment, any parameter of any operation may be modified in this aspect of the present invention. In the illustrative example where the tools 14 are process tools employed in semiconductor manufacturing operations, such parameters may include, but are not limited to, the duration or polishing arm downforce of a chemical mechanical polishing operation, the duration of an etching process, the combination or concentration of etchants used in an etching process, the gas flow rate to a chemical deposition process, temperature, etc. By way of example only, in one embodiment, the duration of the process operation, e.g., thermal growth process, performed in the tools 14 may be increased or decreased to compensate for the change in thickness of the process layer due to the change in external data 22 beyond the preselected allowable limits. Such a change in an operating parameter of the tools 14 may be supplied to the tools 14 on an individual basis or a modification may be made to an operating recipe that is supplied to each of the tools 14 via the controller 90 and/or the controllers 145.

In another illustrative example, the external data 22 may reflect wafer state data. For example, in the context where the tools 14 are chemical mechanical polishing tools that are adapted to perform a chemical mechanical polishing process on a process layer formed on the wafer in a previous process operation performed by another process tool, e.g., a deposition tool. However, for a variety of reasons, the deposition process results in the process layer having a thickness that exceeds the allowable limit for the deposited process layer. Nevertheless, workpieces with the overly-thick process layer are sent to the polishing tool 14 where chemical mechanical polishing operations will be performed to planarize the surface of the process layer and/or to remove excess portions of the process layer. The CMP tool 14 may employ a fault detection routine wherein a fault condition is indicated if the duration of the polishing process exceeds a predetermined value or does not fall within a preselected range of allowable values.

As before, if the FDC unit 12 receives a fault indication from one or more of the tools 14, the external data 22 may be reviewed to determine if the indicated fault conditions are valid or merely indicative of a systemic problem due to variations in the external data 22 beyond acceptable limits. More specifically, if all of the CMP tools 14 indicate a fault condition, and the monitored external data 22, e.g., thickness of incoming process layer, exceeds allowable limits, then the FDC unit 12 may determine that the indicated fault conditions are not valid fault conditions as it relates to the individual CMP tools 14. That is, the indicated fault conditions are more likely indicative of a general systemic problem due to the change in value of the extrinsic data beyond allowable limits.

The FDC unit 12 and/or the controller 90 may take various corrective actions to compensate for such a situation. In one embodiment, the fault detection control routine employed on the various tools may be modified, at least temporarily, such that the CMP tools 14 do not indicate a fault condition due to an excessive duration of the CMP process. The controller 90 may also modify one or more parameters of the deposition process used to form the incoming process layers on future substrates to cause process layers on future substrates to be formed to a thickness that is within acceptable limits.

Of course, if the wafer state external data 22 does not reflect a systemic problem, then the indicated fault conditions for one or more of the CMP tools 14 may be declared to be valid. In that case, the affected CMP tool 14 may be removed from service and/or other corrective actions may be taken in accordance with the fault detection control scheme in place within the manufacturing facility.

Figure 4:
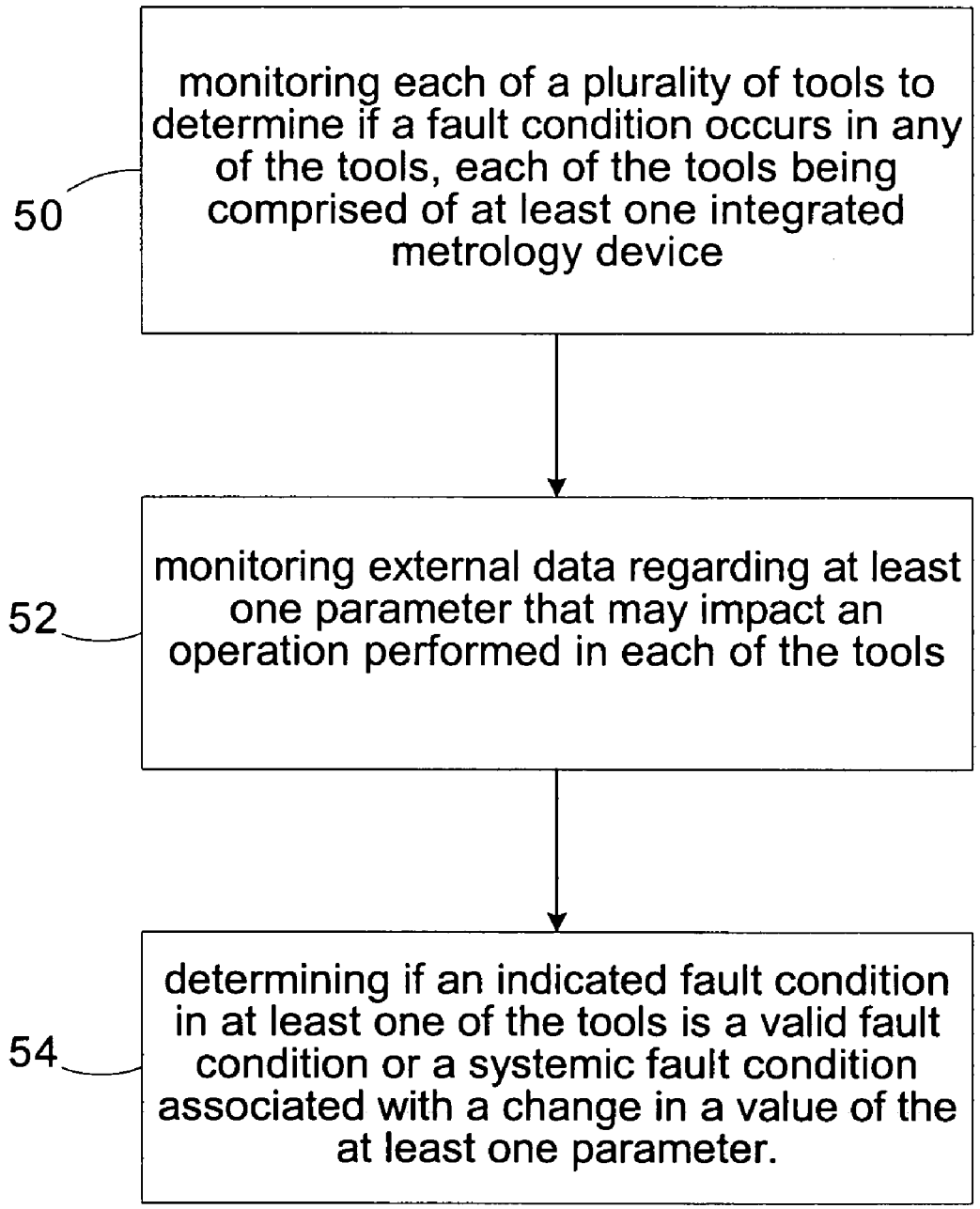
FIG. 4 is a simplified flow diagram of a method of analyzing fault detection conditions in accordance with one illustrative embodiment of the present invention.

The present invention is generally directed to various methods and systems for fault detection control of multiple tools based upon external data. The present invention may be employed with any type of tool, e.g., process tools, metrology tools, etc. One illustrative method is depicted in flowchart form in FIG. 4. As shown therein, in one illustrative embodiment, the method comprises monitoring each of a plurality of tools to determine if a fault condition occurs in any of the tools, each of the tools being comprised of at least one integrated metrology device, as indicated in block 50, monitoring external data regarding at least one parameter that may impact an operation performed in each of the tools, as recited in block 52, and determining if an indicated fault condition in at least one of the tools is a valid fault condition or a systemic fault condition associated with a change in a value of the at least one parameter, as set forth in block 54. In further embodiments, the method comprises processing a plurality of additional workpieces in the tools after the step of determining if the indicated fault condition is a valid fault condition or a systemic fault condition is performed.

In another illustrative embodiment, the method comprises monitoring each of a plurality of tools to determine if a fault condition occurs in any of the tools, each of the tools being comprised of at least one integrated metrology device, monitoring external data regarding at least one environmental parameter that may impact an operation performed in each of the tools, and determining if an indicated fault condition in at least one of the tools is a valid fault condition or a systemic fault condition associated with a change in a value of the at least one parameter.

In yet another illustrative embodiment, the method comprises monitoring each of a plurality of tools to determine if a fault condition occurs in any of the tools, each of the tools being comprised of at least one integrated metrology device, monitoring external data regarding at least one parameter that may impact an operation performed in each of the tools, and determining if an indicated fault condition in at least one of the tools is a valid fault condition or a systemic fault condition associated with a change in a value of the at least one parameter. In further embodiments, the method comprises processing additional workpieces in the tools after the step of determining if the indicated fault condition is a valid fault condition or a systemic fault condition is performed. In some embodiments, the workpieces may be semiconducting substrates or wafers.

In a further illustrative embodiment, the method comprises monitoring each of a plurality of tools that process at least one semiconducting wafer to determine if a fault condition occurs in any of the tools, each of the tools being comprised of at least one integrated metrology device, monitoring external data regarding at least one environmental parameter that may impact an operation performed in each of the tools, and determining if an indicated fault condition in at least one of the tools is a valid fault condition or a systemic fault condition associated with a change in a value of the at least one parameter.

In yet a further illustrative embodiment, the method comprises monitoring each of a plurality of tools that process at least one wafer to determine if a fault condition occurs in any of the tools, each of the tools being comprised of at least one integrated metrology device, monitoring external data regarding at least one parameter that reflects a physical characteristic of at least one wafer, and determining if an indicated fault condition in at least one of the tools is a valid fault condition or a systemic fault condition associated with a change in a value of the at least one parameter.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
monitoring each of a plurality of tools to determine if a fault condition occurs in any of said tools, each of said tools being comprised of at least one integrated metrology device;
monitoring external data regarding at least one parameter that may impact an operation performed in each of said tools; and
determining if an indicated fault condition in at least one of said tools is a valid fault condition or a systemic fault condition associated with a change in a value of said at least one parameter.

2. The method of claim 1, wherein said plurality of tools are process tools.

3. The method of claim 1, wherein said plurality of tools are metrology tools.

4. The method of claim 1, further comprising indicating that said indicated fault condition is a valid fault condition when a value of said at least one parameter remains within established acceptable limits.

5. The method of claim 1, wherein a fault condition is indicated for each of said plurality of tools and wherein the method further comprises indicating that said indicated fault conditions for said plurality of tools are not valid fault conditions when a value of said parameter is not within established acceptable limits.

6. The method of claim 1, further comprising providing an adjustment factor to future metrology data received from said at least one integrated metrology device on each of said plurality of tools based upon a determination that said value of said parameter is not within established acceptable limits.

7. The method of claim 1, further comprising adjusting at least one parameter of an operation to be performed in each of said plurality of tools based upon a determination that said value of said parameter is not within established acceptable limits.

8. The method of claim 1, wherein said step of monitoring each of said plurality of tools and monitoring said external data is performed in a fault detection module.

9. The method of claim 1, wherein said parameter is comprised of at least one of atmospheric pressure, pressure within a manufacturing facility, humidity, a flow rate of a liquid supplied to all of said tools, a pressure of a fluid supplied to all of said tools, ambient temperature, a concentration of chemical supplied to all of said tools, a concentration of a chemical mechanical polishing slurry, and a chemical make-up of at least one gas.

10. The method of claim 1, wherein said at least one parameter reflects a physical characteristic of at least one workpiece.

11. The method of claim 1, wherein said parameter comprises at least one of a thickness of a process layer formed above at least one workpiece, a surface profile of at least one workpiece, a critical dimension of a feature formed on at least one workpiece, and an optical property of a film.

12. The method of claim 1, wherein said at least one integrated metrology device comprises at least one sensor operatively coupled to said tool.

13. The method of claim 1, wherein said at least one integrated metrology device comprises a metrology chamber having at least one sensor positioned adjacent thereto.

14. The method of claim 1, wherein each of said tools are process tools that can perform at least one of a deposition process, a thermal growth process, an ion implant process, a heating process, a chemical mechanical polishing process, an etching process and a photolithography process.

15. The method of claim 1, wherein each of said plurality of tools comprises a local controller operatively coupled to said tool, and wherein a supervisory computer operatively coupled to each of said local controllers performs the steps recited in claim 1.

16. The method of claim 1, further comprising processing a plurality of workpieces in said tools after said step of determining if said indicated fault condition is a valid fault condition or a systemic fault condition is performed.

17. A method, comprising:
monitoring each of a plurality of tools to determine if a fault condition occurs in any of said tools, each of said tools being comprised of at least one integrated metrology device;
monitoring external data regarding at least one environmental parameter that may impact an operation performed in each of said tools; and
determining if an indicated fault condition in at least one of said tools is a valid fault condition or a systemic fault condition associated with a change in a value of said at least one parameter.

18. The method of claim 17, wherein said plurality of tools are process tools.

19. The method of claim 17, wherein said plurality of tools are metrology tools.

20. The method of claim 17, further comprising indicating that said indicated fault condition is a valid fault condition when a value of said at least one parameter remains within established acceptable limits.

21. The method of claim 17, wherein a fault condition is indicated for each of said plurality of tools and wherein the method further comprises indicating that said indicated fault conditions for said plurality of tools are not valid fault conditions when a value of said parameter is not within established acceptable limits.

22. The method of claim 17, further comprising providing an adjustment factor to future metrology data received from said at least one integrated metrology device on each of said plurality of tools based upon a determination that said value of said parameter is not within established acceptable limits.

23. The method of claim 17, further comprising adjusting at least one parameter of an operation to be performed in each of said plurality of tools based upon a determination that said value of said parameter is not within established acceptable limits.

24. The method of claim 17, further comprising processing a plurality of wafers in said tools after said step of determining if said indicated fault condition is a valid fault condition or a systemic fault condition is performed.

25. A method, comprising:
monitoring each of a plurality of tools that process at least one wafer to determine if a fault condition occurs in any of said tools, each of said tools being comprised of at least one integrated metrology device;
monitoring external data regarding at least one parameter that reflects a physical characteristic of said at least one wafer; and
determining if an indicated fault condition in at least one of said tools is a valid fault condition or a systemic fault condition associated with a change in a value of said at least one parameter.

26. The method of claim 25, wherein said plurality of tools are process tools.

27. The method of claim 25, wherein said plurality of tools are metrology tools.

28. The method of claim 25, further comprising indicating that said indicated fault condition is a valid fault condition when a value of said at least one parameter remains within established acceptable limits.

29. The method of claim 25, wherein a fault condition is indicated for each of said plurality of tools and wherein the method further comprises indicating that said indicated fault conditions for said plurality of tools are not valid fault conditions when a value of said parameter is not within established acceptable limits.

30. The method of claim 25, further comprising providing an adjustment factor to future metrology data received from said at least one integrated metrology device on each of said plurality of tools based upon a determination that said value of said parameter is not within established acceptable limits.

31. The method of claim 25, further comprising adjusting at least one parameter of an operation to be performed in each of said plurality of tools based upon a determination that said value of said parameter is not within established acceptable limits.

32. A method, comprising:
monitoring each of a plurality of process tools that process at least one workpiece to determine if a fault condition occurs in any of said process tools, each of said process tools being comprised of at least one integrated metrology device;
monitoring external data regarding at least one parameter that may impact a process operation performed in each of said process tools; and
determining if an indicated fault condition in at least one of said process tools, is a valid fault condition or a systemic fault condition associated with a change in a value of said at least one parameter.

33. The method of claim 32, further comprising indicating that said indicated fault condition is a valid fault condition when a value of said at least one parameter remains within established acceptable limits.

34. The method of claim 32, wherein a fault condition is indicated for each of said plurality of process tools and wherein the method further comprises indicating that said indicated fault conditions for said plurality of process tools are not valid fault conditions when a value of said parameter is not within established acceptable limits.

35. The method of claim 32, further comprising providing an adjustment factor to future metrology data received from said at least one integrated metrology device on each of said plurality of process tools based upon a determination that said value of said parameter is not within established acceptable limits.

36. The method of claim 32, further comprising adjusting at least one parameter of a process operation to be performed in each of said plurality of process tools based upon a determination that said value of said parameter is not within established acceptable limits.

37. The method of claim 32, wherein said step of monitoring each of said plurality of process tools and monitoring said external data is performed in a fault detection module.

38. The method of claim 32, wherein said at least one parameter reflects a physical characteristic of said at least one workpiece.

39. The method of claim 32, wherein said at least one integrated metrology device comprises at least one sensor operatively coupled to each of said process tools.

40. The method of claim 32, wherein said at least one integrated metrology device comprises a metrology chamber having at least one sensor positioned adjacent thereto.

41. The method of claim 32, wherein each of said process tools can perform at least one of a deposition process, a thermal growth process, an ion implant process, a heating process, an etching process and a photolithography process.

42. The method of claim 32, wherein each of said plurality of process tools comprises a local controller operatively coupled to said tool, and wherein a supervisory computer operatively coupled to each of said local controllers performs the steps recited in claim 32.

43. The method of claim 32, further comprising processing a plurality of workpieces in said process tools after said step of determining if said indicated fault condition is a valid fault condition or a systemic fault condition is performed.

44. A method, comprising:
monitoring each of a plurality of process tools that process at least one semiconducting wafer to determine if a fault condition occurs in any of said process tools, each of said process tools being comprised of at least one integrated metrology device;
monitoring external data regarding at least one environmental parameter that may impact a process operation performed in each of said process tools; and
determining if an indicated fault condition in at least one of said process tools is a valid fault condition or a systemic fault condition associated with a change in a value of said at least one parameter.

45. The method of claim 44, further comprising indicating that said indicated fault condition is a valid fault condition when a value of said at least one parameter remains within established acceptable limits.

46. The method of claim 44, wherein a fault condition is indicated for each of said plurality of process tools and wherein the method further comprises indicating that said indicated fault conditions for said plurality of process tools are not valid fault conditions when a value of said parameter is not within established acceptable limits.

47. The method of claim 44, further comprising providing an adjustment factor to future metrology data received from said at least one integrated metrology device on each of said plurality of process tools based upon a determination that said value of said parameter is not within established acceptable limits.

48. The method of claim 44, further comprising adjusting at least one parameter of a process operation to be performed in each of said plurality of process tools based upon a determination that said value of said parameter is not within established acceptable limits.

49. The method of claim 44, further comprising processing a plurality of wafers in said process tools after said step of determining if said indicated fault condition is a valid fault condition or a systemic fault condition is performed.

50. A method, comprising:
monitoring each of a plurality of process tools that process at least one wafer to determine if a fault condition occurs in any of said process tools, each of said process tools being comprised of at least one integrated metrology device;
monitoring external data regarding at least one parameter that reflects a physical characteristic of said at least one wafer; and
determining if an indicated fault condition in at least one of said process tools is a valid fault condition or a systemic fault condition associated with a change in a value of said at least one parameter.

51. The method of claim 50, further comprising indicating that said indicated fault condition is a valid fault condition when a value of said at least one parameter remains within established acceptable limits.

52. The method of claim 50, wherein a fault condition is indicated for each of said plurality of process tools and wherein the method further comprises indicating that said indicated fault conditions for said plurality of tools are not valid fault conditions when a value of said parameter is not within established acceptable limits.

53. The method of claim 50, further comprising providing an adjustment factor to future metrology data received from said at least one integrated metrology device on each of said plurality of process tools based upon a determination that said value of said parameter is not within established acceptable limits.

54. The method of claim 50, further comprising adjusting at least one parameter of a process operation to be performed in each of said plurality of process tools based upon a determination that said value of said parameter is not within established acceptable limits.

55. The method of claim 50, further comprising processing a plurality of wafers in said process tools after said step of determining if said indicated fault condition is a valid fault condition or a systemic fault condition is performed.

* * * * *